(12) United States Patent
Shimizu et al.

(10) Patent No.: US 10,656,366 B2
(45) Date of Patent: May 19, 2020

(54) LENS UNIT

(71) Applicant: NANCHANG O-FILM OPTICAL-ELECTRONIC TECH CO., LTD., Nanchang (CN)

(72) Inventors: Motokazu Shimizu, Saitama (JP); Kensuke Masui, Saitama (JP)

(73) Assignee: NANCHANG O-FILM OPTICAL-ELECTRONIC TECH CO., LTD., Nanchang (CN)

( * ) Notice: Subject to any disclaimer, the term of this patent is extended or adjusted under 35 U.S.C. 154(b) by 148 days.

(21) Appl. No.: 16/118,457

(22) Filed: Aug. 31, 2018

(65) Prior Publication Data

US 2018/0372983 A1 Dec. 27, 2018

Related U.S. Application Data

(63) Continuation of application No. PCT/JP2017/009627, filed on Mar. 9, 2017.

(30) Foreign Application Priority Data

Mar. 29, 2016 (JP) .................................. 2016-065654

(51) Int. Cl.
*G02B 7/02* (2006.01)
*G03B 17/08* (2006.01)
(52) U.S. Cl.
CPC .............. *G02B 7/021* (2013.01); *G03B 17/08* (2013.01)
(58) Field of Classification Search
CPC . G02B 7/021; G02B 7/26; G02B 7/02; G03B 17/08; H04N 5/2254
See application file for complete search history.

(56) References Cited

U.S. PATENT DOCUMENTS

| 2016/0091690 A1* | 3/2016 | Nakajima | G02B 1/041 359/754 |
| 2018/0196171 A1* | 7/2018 | Hsu | G02B 5/005 |
| 2019/0187402 A1* | 6/2019 | Masuzawa | G02B 7/022 |

FOREIGN PATENT DOCUMENTS

| JP | 2005-215503 A | 8/2005 |
| JP | 2008-233414 A | 10/2008 |

(Continued)

OTHER PUBLICATIONS

International Search Report issued in International Application No. PCT/JP2017/009627 dated Jun. 6, 2017.

(Continued)

*Primary Examiner* — Cara E Rakowski
(74) *Attorney, Agent, or Firm* — Hodgson Russ LLP

(57) ABSTRACT

A lens unit includes: a lens in which first and second circular portions are arranged in an optical axis direction, the first circular portion having a first diameter, the second circular portion having a second diameter larger than the first diameter; a sealing member that is annular when viewed in the optical axis direction and that has an inner peripheral surface that contacts an outer peripheral surface of the first circular portion; and a lens barrel including first and second inner wall portions, the first inner wall portion being circular when viewed in the optical axis direction and pressing the sealing member between the first inner wall portion and the first circular portion, the second inner wall portion having three or more contact portions that contact an outer peripheral surface of the second circular portion and that are arranged with spaces therebetween in a circumferential direction of the lens.

13 Claims, 11 Drawing Sheets

(56) References Cited

FOREIGN PATENT DOCUMENTS

| | | |
|---|---|---|
| JP | 2011-59396 A | 3/2011 |
| JP | 2012-78610 A | 4/2012 |
| JP | 4999508 B2 | 8/2012 |

OTHER PUBLICATIONS

Written Opinion of the ISA issued in International Application No. PCT/JP2017/009627 dated Jun. 6, 2017.

* cited by examiner

LENS UNIT

CROSS-REFERENCE TO RELATED APPLICATIONS

This application is a continuation application of International Application No. PCT/JP2017/009627, filed on Mar. 9, 2017, which is incorporated herein by reference in its entirety. Further, this application claims priority from Japanese Patent Application No. 2016-065654, filed on Mar. 29, 2016, the disclosure of which is incorporated by reference herein in its entirety.

BACKGROUND

Technical Field

The present disclosure relates to a lens unit.

Related Art

JP4999508B describes an example of a lens unit in which a plurality of lenses are contained in a lens barrel.

The lens unit described in JP4999508B has a lens barrel and a lens group composed of a plurality of lenses. In the lens group, a lens nearest to the object is made of glass and has a recessed portion in a peripheral edge thereof on a side near an adjacent lens. A sealing member is disposed in the recessed portion. In the lens barrel, a receiving portion that receives the lens nearest to the object has an inner peripheral surface that is circular when viewed in the optical axis direction.

However, in the lens unit described in JP4999508B, an inner wall portion of the lens barrel that contacts an outer peripheral surface of a large-diameter lens is circular when viewed in the optical axis direction. With a structure in which a lens and an inner wall portion, each of which is circular when viewed in the optical axis direction, contact each other, a frictional force is applied to the entire periphery of the lens when inserting the lens into the lens barrel. Therefore, it is difficult to correct the inclination of the optical axis of the lens, and it is difficult to assemble the lens unit.

SUMMARY

In consideration of the facts described above, the present disclosure provides a lens unit that has high sealability in a lens barrel and that can improve ease of assembly of the lens unit, compared with a structure in which a second inner wall portion of a lens barrel is circular when viewed in the optical axis direction.

A lens unit according to a first aspect of the present disclosure has a lens in which a first circular portion and a second circular portion are arranged in an optical axis direction, the first circular portion having a first diameter when viewed in the optical axis direction, the second circular portion having a second diameter larger than the first diameter when viewed in the optical axis direction; a sealing member that is annular when viewed in the optical axis direction and that has an inner peripheral surface that contacts an outer peripheral surface of the first circular portion; and a lens barrel including a first inner wall portion and a second inner wall portion, the first inner wall portion being circular when viewed in the optical axis direction and pressing the sealing member between the first inner wall portion and the first circular portion, the second inner wall portion having three or more contact portions that contact an outer peripheral surface of the second circular portion and that are arranged with spaces therebetween in a circumferential direction of the lens.

With the lens unit according to the first aspect, the sealing member is pressed between the first circular portion of the lens and the first inner wall portion of the lens barrel. The first inner wall portion is circular when viewed in the optical axis direction, and a gap is less likely to be formed between the sealing member and the first inner wall portion when the sealing member contacts the first inner wall portion. Therefore, high sealability in the lens barrel can be achieved.

Moreover, because the second inner wall portion of the lens barrel has the three or more contact portions, which are arranged with spaces therebetween in the circumferential direction of the lens, the contact state between the second circular portion and the second inner wall portion is a multiple-point-fitted state in which the second circular portion and the second inner wall portion are fitted to each other at multiple points that are separated with spaces therebetween in the circumferential direction of the lens. Because the fitted state between the second circular portion and the second inner wall portion of the lens barrel is multiple-point-fitted state, the contact area between the second circular portion and the contact portions is smaller than the contact area in a case where the second circular portion and the entire periphery of the second inner wall portion contact each other. Therefore, the second circular portion can be easily inserted into the lens barrel. That is, ease of assembly of the lens unit can be improved, compared with a structure in which the second inner wall portion of the lens barrel is circular when viewed in the optical axis direction.

In a lens unit according to a second aspect of the present disclosure, the second inner wall portion has a polygonal shape when viewed in the optical axis direction, and the contact portions are flat surfaces that correspond to sides of the polygonal shape.

With the lens unit according to the second aspect, because the second inner wall portion has a polygonal shape when viewed in the optical axis direction, contact between the second circular portion and each of the contact portions of the second inner wall portion is point contact when viewed in the optical axis direction. Because the contact between the second circular portion and the contact portions is point contact, the contact area between the second circular portion and the contact portions is reduced and therefore a frictional force between the second circular portion and the contact portions is reduced, compared with a structure in which the second circular portion and the contact portions line-contact each other in the circumferential direction when viewed in the optical axis direction. That is, ease of assembly of the lens unit can be improved.

In a lens unit according to a third aspect of the present disclosure, the second inner wall portion has curved surfaces that connect the flat surfaces that are adjacent to each other in the circumferential direction.

With the lens unit according to the third aspect, the flat surface and the flat surface are connected by the curved surface. Therefore, stress concentration on a part of the lens barrel can be suppressed, compared with a structure in which the flat surfaces of the second inner wall portion that are adjacent to each other in the circumferential direction are directly connected.

In a lens unit according to a fourth aspect of the present disclosure the contact portions have curved surfaces that are recessed outward in a radial direction of the lens barrel when viewed in the optical axis direction and that line-contact the second circular portion.

With the lens unit according to the fourth aspect, when viewed in the optical axis direction, because the curved surfaces of the contact portions and the side surface of the second circular portion line-contact each other, separation of second circular portion from the contact portions can be suppressed, compared with a structure in which the contact portions and the side surface of the second circular portion point-contact each other.

In a lens unit according to a fifth aspect of the present disclosure, the second circular portion is disposed on an object side relative to the first circular portion in the optical axis direction.

With the lens unit according to the fifth aspect, the second circular portion is disposed on the object side relative to the first circular portion, and the second inner wall portion at which the lens and the lens barrel are fitted to each other at multiple points, is disposed on the object side relative to the first inner wall portion. Because the second inner wall portion at which the lens and the lens barrel are fitted to each other at multiple points, is disposed on the object side relative to the first inner wall portion, when the lens is installed in the lens barrel, the fitted state between the second inner wall portion and the lens can be easily checked from the object side relative to the lens barrel.

In a lens unit according to a sixth aspect of the present disclosure, an inclined surface is formed at a position on the object side relative to the second inner wall portion in the optical axis direction, the inclined surface being inclined in such a way that a part thereof on the object side is farther from the optical axis than a part thereof on an image surface side.

With the lens unit according to the sixth aspect, when the lens is inserted into the lens barrel in a state in which the position of the optical axis of the lens is displaced from the central axis of the lens barrel, an outer periphery of the second circular portion of the lens is guided by the inclined surface, thereby the second circular portion is fitted to the second inner wall portion. That is, because the outer periphery of the second circular portion of the lens is guided by the inclined surface, the operation of inserting the lens into the lens barrel can be easily performed, compared with a structure that does not have the inclined surface.

In a lens unit according to a seventh aspect of the present disclosure, the first inner wall portion protrudes toward the optical axis relative to the second inner wall portion when viewed in the optical axis direction.

With the lens unit according to the seventh aspect, the inside diameter of the first inner wall portion is smaller than the diameter of an inscribed circle of the second inner wall portion when viewed in the optical axis direction. In other words, a space inside the second inner wall portion is larger than a space inside the first inner wall portion. Therefore, when assembling the lens unit, sticking of the sealing member, which contacts the first inner wall portion, on the second inner wall portion can be suppressed.

In a lens unit according to an eighth aspect of the present disclosure, the first inner wall portion has a portion that the sealing member does not contact and to which the lens is fitted, and the lens has a third circular portion that is fitted to the first inner wall portion.

With the lens unit according to the eighth aspect, which has fitting portions of the first inner wall portion and the third circular portion in addition to the contact portions of the first circular portion and the sealing member, inclination of the optical axis of the lens can be suppressed, compared with a structure that does not have the third circular portion.

In a lens unit according to the ninth aspect of the present disclosure, the third circular portion is disposed between the first circular portion and the second circular portion in the optical axis direction.

With lens unit according to the ninth aspect, a step is formed by an end surface of the third circular portion in the optical axis direction and the outer peripheral surface of the first circular portion. When the lens is installed in the lens barrel, the sealing member contacts the step and is pressed in the optical axis direction. Therefore, when fitting the lens into the lens barrel, displacement of the sealing member from the lens in the optical axis direction can be suppressed.

In a lens unit according to a tenth aspect of the present disclosure, the first circular portion is disposed on an object side relative to the second circular portion in the optical axis direction.

With the lens unit according to the tenth aspect, because the first circular portion is disposed on the object side relative to the second circular portion, the sealing member is disposed at a position farthest toward the object side in the lens barrel. Therefore, whether the sealing member is fitted in the gap between the first inner wall portion and the first circular portion can be easily checked.

In a lens unit according to an eleventh aspect of the present disclosure, the lens has a third circular portion that is fitted to the first inner wall portion.

With the lens unit according to the eleventh aspect, because the lens unit has fitting portions of the first inner wall portion and the third circular portion in addition the contact portions of the first inner wall portion and the sealing member. Therefore, inclination of the optical axis of the lens can be suppressed, compared with a structure that does not have the third circular portion.

In a lens unit according to a twelfth aspect of the present disclosure, the third circular portion is disposed between the first circular portion and the second circular portion in the optical axis direction.

With the lens unit according to the twelfth aspect, because the third circular portion is disposed on the image surface side relative to the first circular portion, the sealing member is not covered by the third circular portion when viewed in the optical axis direction. Because the sealing member is not covered by the third circular portion, the sealing member can be visually checked easily.

A lens unit according to a thirteenth aspect is a lens unit that is described in any of the first aspect to the twelfth aspect and that is a vehicle-mount lens unit or a monitoring lens unit.

With the vehicle-mount lens unit or the monitoring lens unit according to the thirteenth aspect, although the lens unit may be exposed to high temperature, even when the lens unit is exposed to high temperature, decrease in performance of the lens unit can be suppressed, compared with a structure in which the second inner wall portion of the lens barrel is circular when viewed in the optical axis direction.

With the present disclosure, it is possible to provide a lens unit that has high sealability in a lens barrel and that can improve ease of assembly of the lens unit compared with a structure in which a second inner wall portion of a lens barrel is circular when viewed in the optical axis direction.

DETAILED DESCRIPTION

Hereinafter, lens units according to exemplary embodiments of the present disclosure will be described. The lens units according to the embodiments are used, for example, in a monitoring camera or a vehicle-mount camera, under an environment that is likely to be exposed to high temperature and in which it is difficult to maintain a high image forming performance; and the lens units according to the embodiments can suppress decrease in performance. A monitoring lens unit is placed in a building or the like and is used to monitor objects and the like around the lens unit. A vehicle-mount lens unit is placed in a vehicle (mainly in the passenger compartment) and is used to see objects and the like outside the vehicle.

First Embodiment

Figure 1:
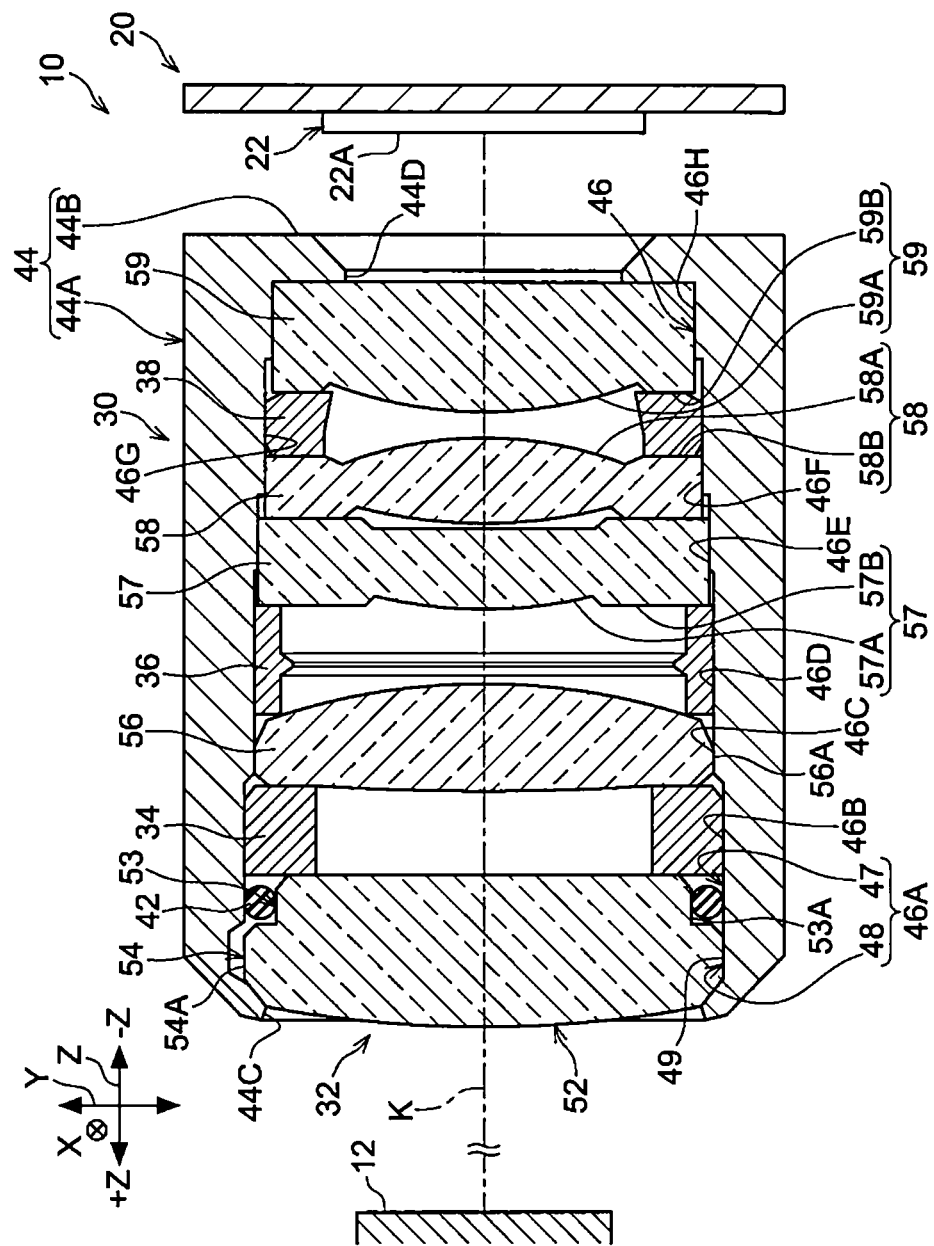
FIG. 1 illustrates the overall structure of a lens unit according to a first embodiment and an imaging module.

FIG. 1 illustrates an imaging device 10. The imaging device 10 is used, for example, in a vehicle-mount camera. The imaging device 10 has an imaging module 20 and a lens unit 30. The imaging device 10 forms an image of an object 12 on the imaging module 20 through the lens unit 30.

In the following description, a direction that is the optical axis direction of light in the lens unit 30 and that is the central axis direction of a lens barrel 44 described below will be referred to as the Z direction. A direction that is a radial direction of a lens group 32 (described below) of the lens unit 30 and that is perpendicular to the Z direction will be referred to as the Y direction. A direction that is perpendicular to the Z direction and the Y direction will be referred to as the X direction. The optical axis of light that is incident on the lens unit 30 from the object side will be referred to as the optical axis K, which is represented by a chain line or a point in the figures.

Imaging Module

The imaging module 20 has an imaging element 22, such as a complementary metal oxide semiconductor (CMOS) image sensor or a charge coupled device (CCD) image sensor. The imaging element 22 is disposed at the image forming point of the lens unit 30 described below and has an image surface 22A facing the lens unit 30 in the Z direction. The image surface 22A is a surface disposed along the X-Y plane. In the following description, the object side in the Z direction will be referred to as the +Z side, and the image surface side in the Z direction will be referred to as the −Z side.

The imaging module 20 is supported by a holder (not shown) attached to the lens unit 30. The imaging module 20 converts light that has reached the imaging module 20 through the lens unit 30 into an electric signal. The electric signal, converted from the light, is converted into analog data or digital data that is image data.

Lens Unit

The lens unit 30 has, for example, the lens group 32; spacer rings 34, 36, and 38; a sealing member 42; and the lens barrel 44. The lens group 32; the spacer rings 34, 36, and 38; and the sealing member 42 are contained in the lens barrel 44.

Lens Group

The lens group 32 has, for example, a first lens 52, a second lens 56, a third lens 57, a fourth lens 58, and a fifth lens 59, which are arranged in order from the +Z side. The first lens 52 is an example of a lens.

Figure 2:
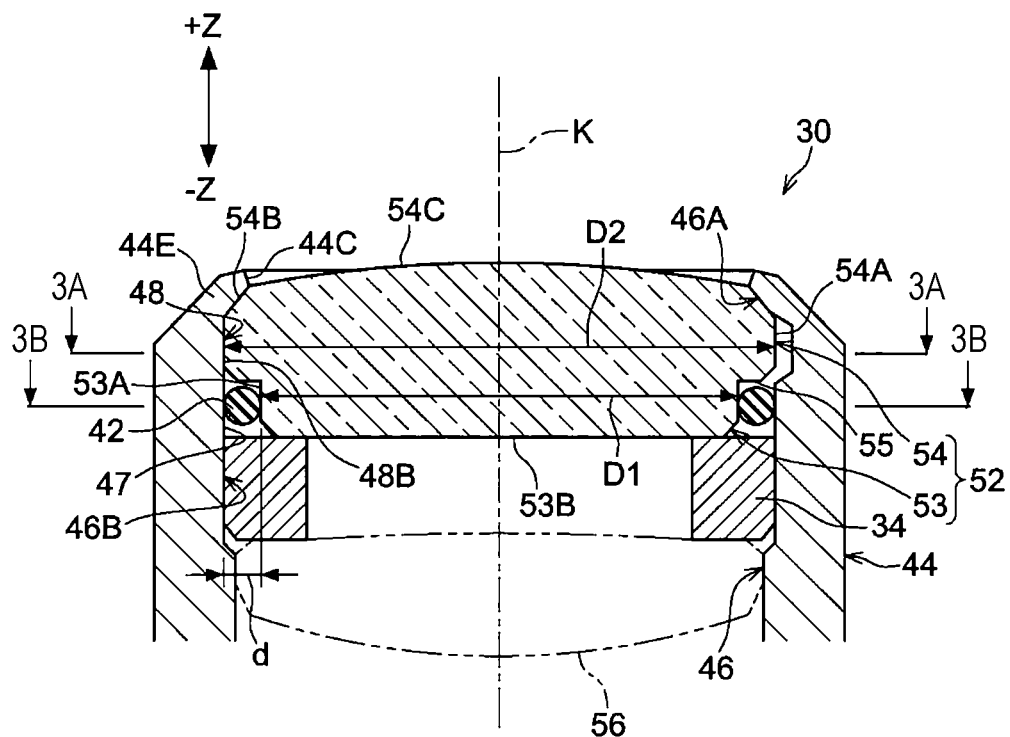
FIG. 2 is a partial longitudinal sectional view of the lens unit according to the first embodiment.

The first lens 52 illustrated in FIG. 2 is made of glass. In the first lens 52, for example, a first circular portion 53 and a second circular portion 54 are arranged in the Z direction and integrated with each other. The second circular portion 54 is disposed on the +Z side relative to the first circular portion 53. The optical axis position of the first circular portion 53 and the optical axis position of the second circular portion 54 are the same when viewed in the Z direction.

First Circular Portion

The first circular portion 53 has a first diameter D1 when viewed in the Z direction. A part of the first circular portion 53 having the first diameter D1 has a side surface 53A that is circular when viewed in the Z direction. An end portion of the side surface 53A on the −Z side in the Z direction is chamfered. The first circular portion 53 has an emission surface 53B, which is an end surface on the −Z side and from which light is emitted.

Second Circular Portion

The second circular portion 54 has a second diameter D2 when viewed in the Z direction. The second diameter D2 is larger than the first diameter D1. A part of the second circular portion 54 having the second diameter D2 has a side surface 54A that is circular when viewed in the Z direction. The second circular portion 54 has a pressed surface 54B, which is formed at a peripheral edge on the +Z side relative to the side surface 54A and which is pressed by the lens barrel 44 by heat caulking as described below. Moreover, the second circular portion 54 has an incident surface 54C, which is an end surface on the +Z side and on which light is incident. An end portion of the side surface 54A on the −Z side in the Z direction is chamfered.

Because the first diameter D1 differs from the second diameter D2, a step 55 is formed at the boundary between the first circular portion 53 and the second circular portion 54. The length d of the step 55 in the Y direction satisfies d=(D2−D1)/2 at each portion in the circumferential direction.

The second lens 56 illustrated in FIG. 1 is made of glass. The second lens 56 has a side surface 56A that is circular when viewed in the Z direction. The second lens 56 allows light that is incident from the +Z side to be emitted toward the −Z side. The third lens 57 has a lens portion 57A, which has optical surfaces (an incident surface and an emission surface) on the +Z side and the −Z side, and a peripheral edge portion 57B, which extends around the lens portion 57A.

The fourth lens 58 has a lens portion 58A, which has optical surfaces (an incident surface and an emission surface) on the +Z side and the −Z side, and a peripheral edge portion 58B, which extends around the lens portion 58A. The peripheral edge portion 57B of the third lens 57 and the peripheral edge portion 58B of the fourth lens 58 are in contact with each other. The fifth lens 59 has a lens portion 59A, which has optical surfaces (an incident surface and an emission surface) on the +Z side and the −Z side, and a peripheral edge portion 59B, which extends around the lens portion 59A.

Spacer Rings

The spacer ring 34 is annular when viewed in the Z direction. An end surface of the spacer ring 34 on the +Z side in the Z direction contacts the first circular portion 53 of the first lens 52, and an end surface of the spacer ring 34 on the −Z side in the Z direction contacts the second lens 56. That is, the spacer ring 34 determines a space between the first lens 52 and the second lens 56 in the Z direction.

The spacer ring 36 is annular when viewed in the Z direction. An end surface of the spacer ring 36 on the +Z side in the Z direction contacts the second lens 56, an end surface of the spacer ring 36 on the −Z side in the Z direction contacts the third lens 57, and thereby the spacer ring 36 determines a space between the second lens 56 and the third lens 57 in the Z direction. The spacer ring 38 is annular when viewed in the Z direction. An end surface of the spacer ring 38 on the +Z side in the Z direction contacts the fourth lens 58, an end surface of the spacer ring 38 on the −Z side in the Z direction contacts the fifth lens 59, and thereby the spacer ring 38 determines a space between the fourth lens 58 and the fifth lens 59 in the Z direction.

Sealing Member

The sealing member 42 illustrated in FIG. 2 is, for example, an O-ring that is made of rubber and that is annular when viewed in the Z direction. In a free state, the inside diameter of the sealing member 42 is smaller than the first diameter D1 of the first lens 52. Therefore, when the sealing member 42 is attached to the first circular portion 53 of the first lens 52, the inner peripheral surface of the sealing member 42 contacts the side surface 53A, which is the outer peripheral surface of the first circular portion 53.

Moreover, for example, in a state in which the sealing member 42 is not attached to the first lens 52, the shape of a cross section of the sealing member 42 in a direction perpendicular to the circumferential direction is circular. The diameter of the cross section of the sealing member 42 is larger than the length d of the step 55 described above. Because the diameter of the cross section of the sealing member 42 is larger than the length d, the sealing member 42 contacts the side surface 53A of the first circular portion 53 of the first lens 52 and a first inner wall portion 47 described below, and seals a space between the first lens 52 and the lens barrel 44.

Lens Barrel

The lens barrel 44 illustrated in FIG. 1 is tubular and is disposed in such a way that the axial direction thereof coincides with the Z direction. To be specific, the lens barrel 44 has a tubular portion 44A, which is open in the Z direction, and a bottom wall portion 44B, which covers the −Z side of the tubular portion 44A. An opening 44C, which is circular when viewed in the Z direction, is formed at an end portion of the tubular portion 44A on the +Z side in a state after heat caulking has been performed by using a jig (not shown). An opening 44D, which extends though the bottom wall portion 44B in the Z direction and has an inside diameter smaller than that of the opening 44C, is formed in the bottom wall portion 44B. A containing portion 46, which is a space for containing the lens group 32, the spacer rings 34, 36, and 38 and the sealing member 42, is formed between the opening 44C and the opening 44D in the lens barrel 44.

The containing portion 46 has, for example, a first containing portion 46A, a second containing portion 46B, a third containing portion 46C, a fourth containing portion 46D, a fifth containing portion 46E, a sixth containing portion 46F, a seventh containing portion 46G, and an eighth containing portion 46H, which are arranged in order from the +Z side toward the −Z side.

The first lens 52 and the sealing member 42 are contained in the first containing portion 46A. The spacer ring 34 is contained in the second containing portion 46B. The second lens 56 is contained in the third containing portion 46C. The spacer ring 36 is contained in the fourth containing portion 46D. The third lens 57 is contained in the fifth containing portion 46E. The fourth lens 58 is contained in the sixth containing portion 46F. The spacer ring 38 is contained in the seventh containing portion 46G. The fifth lens 59 is contained in the eighth containing portion 46H.

Details of the first containing portion 46A will be described below. An inner wall of the second containing portion 46B, an inner wall of the fourth containing portion 46D, and an inner wall of the seventh containing portion 46G are each, for example, circular when viewed in the Z direction. Although illustration is omitted, the inside diameter da of the second containing portion 46B, the inside diameter of db of the fourth containing portion 46D, and the inside diameter dc of the seventh containing portion 46G satisfy da>db>dc.

An inner wall of the third containing portion 46C, an inner wall of the fifth containing portion 46E, an inner wall of the sixth containing portion 46F, and an inner wall of the eighth containing portion 46H each has, for example, a regular octagonal shape when viewed in the Z direction. A space inside the third containing portion 46C, a space inside the fifth containing portion 46E, a space inside the sixth containing portion 46F, and a space inside the eighth containing portion 46H decrease in size in this order, and the space inside the eighth containing portion 46H is the smallest.

The first containing portion 46A illustrated in FIG. 2 includes the first inner wall portion 47, which is disposed on the −Z side, and a second inner wall portion 48, which is disposed on the +Z side relative to the first inner wall portion 47. The first inner wall portion 47 and the second inner wall portion 48 are arranged in the Z direction. When viewed in the Z direction, the central position of the first inner wall portion 47 and the central position of the second inner wall portion 48 are the same.

First Inner Wall Portion

Figure 3A:
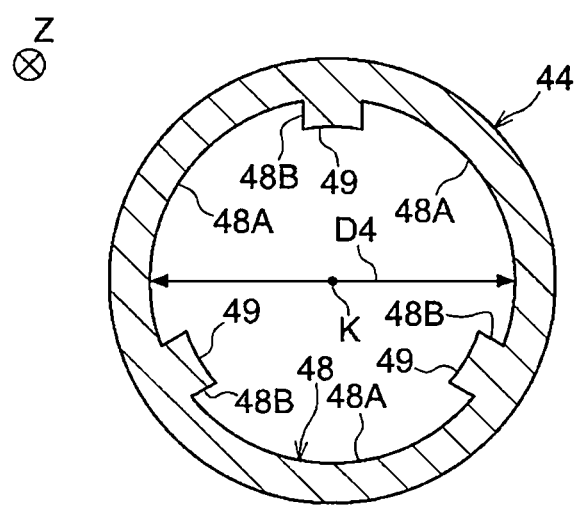
FIG. 3A is a cross-sectional view (taken along line 3A-3A in FIG. 2) of a second inner wall portion according to the first embodiment.
Figure 3B:
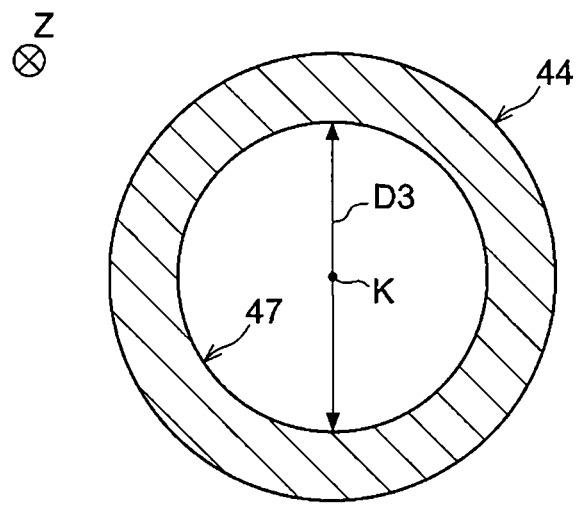
FIG. 3B is a cross-sectional view (taken along line 3B-3B in FIG. 2) of a first inner wall portion according to the first embodiment.

The first inner wall portion 47 illustrated in FIG. 3B is circular when viewed in the Z direction and extend in the Z direction. The inside diameter of the first inner wall portion 47 is denoted by D3.

In a state in which the first lens 52 and the sealing member 42 are contained in the first containing portion 46A illustrated in FIG. 2, the first inner wall portion 47 faces the side surface 53A of the first circular portion 53 in the radial direction. The inside diameter D3 of the first inner wall portion 47 (see FIG. 3B), the first diameter D1, and the length d satisfy D1 <D3<(D1+2d). That is, in the state in which the first lens 52 and the sealing member 42 are contained in the first containing portion 46A, the first inner wall portion 47 and the first circular portion 53 press the sealing member 42 therebetween, and therefore the sealing member 42 is compressed in the radial direction.

Second Inner Wall Portion

The second inner wall portion 48 illustrated in FIG. 3A has, for example, three arc portions 48A and three contact portions 48B, which are alternately arranged in the circumferential direction of the first lens 52 (see FIG. 2) when viewed in the Z direction.

The three arc portions 48A are disposed on an imaginary circle (not shown). The diameter D4 of the imaginary circle on which the three arc portions 48A are disposed is larger than the inside diameter D3 described above (see FIG. 3B).

The three contact portions 48B are arranged, for example, at a pitch of a central angle of 120° in the circumferential direction of the first lens 52 (see FIG. 2) when viewed in the Z direction. The three contact portions 48B protrude from the arc portions 48A toward the optical axis K by the same length. The three contact portions 48B have contact surfaces 49 at ends thereof on the optical axis K side. The three contact surfaces 49, which are examples of curved surfaces, are curved surfaces that are recessed outward in the radial direction, when viewed in the Z direction, in accordance with the shape of the side surface 54A of the second circular portion 54 (see FIG. 2). The three contact surfaces 49 contact parts of the side surface 54A of the second circular portion 54 (see FIG. 2).

In a state in which the first lens 52 and the sealing member 42 are contained in the first containing portion 46A illustrated in FIG. 2, the second inner wall portion 48 faces or contacts the outer peripheral surface of the second circular portion 54 in the radial direction. A peripheral edge portion of the second inner wall portion 48 around the opening 44C is, for example, a heat caulking portion 44E, which is thinner than a part of the second inner wall portion 48 on the first inner wall portion 47 side and which is bent toward the optical axis K by heat caulking.

Assembly of Lens Unit

When assembling the lens unit 30 illustrated in FIG. 1, the fifth lens 59, the spacer ring 38, the fourth lens 58, the third lens 57, the spacer ring 36, the second lens 56, and the spacer ring 34 are fitted into the containing portion 46 of the lens barrel 44 in order from the bottom wall portion 44B side and stacked in the Z direction. Next, in a state in which the sealing member 42 is attached to the outer peripheral surface of the first circular portion 53, the first lens 52 is inserted into the first containing portion 46A from the first circular portion 53 side.

When the first circular portion 53 is inserted to a position where the first circular portion 53 faces the first inner wall portion 47, the sealing member 42 is compressed in the radial direction, and a repulsive force of the sealing member 42 is applied to the first circular portion 53 and the first inner wall portion 47. That is, the sealing member 42 seals the space between the side surface 53A of the first circular portion 53 and the first inner wall portion 47. Moreover, three parts of the side surface 54A of the second circular portion 54 in the circumferential direction contact the three contact surfaces 49. The contact state between the three contact surfaces 49 and the second circular portion 54 is a multiple-point-fitted state.

The heat caulking portion 44E of the lens barrel 44 is heat caulked by using a jig (not shown) after the first lens 52 has been inserted into the first containing portion 46A, thereby the heat caulking portion 44E is bent toward the optical axis K, and the pressed surface 54B of the first lens 52 is pressed by the heat caulking portion 44E toward the −Z side. That is, the heat caulking portion 44E fixes the first lens 52, the spacer ring 34, the second lens 56, the spacer ring 36, the third lens 57, the fourth lens 58, the spacer ring 38, and the fifth lens 59 in the containing portion 46 of the lens barrel 44. In a state in which the lens unit 30 has been assembled, the optical axis K of the lens group 32 coincides with the central axis of the tubular portion 44A of the lens barrel 44.

Operational Effects

Next, operational effects of the lens unit 30 according to the first embodiment will be described.

With the lens unit 30 illustrated in FIG. 2, the sealing member 42 is pressed between the side surface 53A of the first circular portion 53 and the first inner wall portion 47 of the lens barrel 44. Because the first inner wall portion 47 is circular when viewed in the Z direction, a gap is less likely to be formed between the sealing member 42 and the first inner wall portion 47 when the sealing member 42, which is annular, contacts the first inner wall portion 47, compared with a case where the sealing member 42 contacts an inner wall portion that has a polygonal shape. That is, high sealability in the lens barrel 44 can be achieved. The term "sealability" refers to an ability of suppressing flow of gas and liquid into the lens barrel 44.

Moreover, with the lens unit 30, when inserting the first lens 52 and the sealing member 42 together into the containing portion 46 of the lens barrel 44, a frictional force is generated between contact portions of the sealing member 42 and the first inner wall portion 47 due to a repulsive force of the sealing member 42.

On the other hand, because the second inner wall portion 48 of the lens barrel 44 has the three contact portions 48B, which are arranged with spaces therebetween in the circumferential direction of the first lens 52, the contact state between the second circular portion 54 and the second inner wall portion 48 is a multiple-point-fitted state at multiple points that are separated with spaces therebetween in the circumferential direction of the first lens 52. That is, the contact area between the second circular portion 54 and the contact portions 48B is smaller than the contact area in a case where the second circular portion 54 and the entire periphery of the second inner wall portion 48 contact each other. Therefore, the second circular portion 54 can be easily inserted into the lens barrel 44. With the lens unit 30, because the second circular portion 54 can be easily inserted into the lens barrel 44, ease of assembly of the lens unit 30 can be improved, compared with a structure in which the second inner wall portion 48 of the lens barrel 44 has a circular shape with the diameter D2 when viewed in the Z direction.

Moreover, the contact portions 48B have the contact surfaces 49, which are recessed outward in the radial direction of the lens barrel 44 when viewed in the Z direction and contact the side surface 54A of the second circular portion 54. Because the contact surfaces 49 of the contact portions 48B and the side surface 54A of the second circular portion 54 line-contact each other when viewed in the Z direction, separation of the second circular portion 54 from the contact portions 48B can be suppressed, compared with a structure in which the contact portions 48B and the second circular portion 54 point-contact each other.

With the lens unit 30, the second circular portion 54 is disposed on the object side relative to the first circular portion 53; and the second inner wall portion 48, which is fitted to the first lens 52 at multiple points, is disposed on the +Z side relative to the first inner wall portion 47, which contacts with a larger contact area than the second inner wall portion 48. That is, a portion whose contact area is small is disposed on the +Z side relative to a portion whose contact area is large. With the lens unit 30, because the second inner wall portion 48 is disposed on the +Z side relative to the first inner wall portion 47, when the first lens 52 has been inserted into the lens barrel 44, the contact state between the second inner wall portion 48 and the first lens 52 can be easily checked from the +Z side of the lens barrel 44.

Moreover, with the lens unit 30, because the contact portions 48B and the second circular portion 54 are fitted to each other at multiple points, the contact area of parts of the contact portions 48B that contact the second circular portion 54 is reduced, compared with the contact area of a structure in which the second inner wall portion 48 is circular when viewed in the Z direction. Because the contact area of the contact portions 48B is reduced, the surface precision of the contact portions 48B can be increased. When used as a vehicle-mount lens unit or a monitoring lens unit, the lens unit 30 may be exposed to high temperature. However, because the surface precision of the contact portions 48B is increased compared with a structure in which the second inner wall portion 48 is circular, the first lens 52 is less likely to incline even if the lens barrel 44 expands due to high temperature. Because the first lens 52 is less likely to incline, decrease in the performance of the lens unit 30 can be suppressed.

Second Embodiment

Next, a lens unit 70 according to a second embodiment will be described. Elements that are the same as those of the first embodiment will be denoted by the same numerals as in the first embodiment, and descriptions of such elements will be omitted.

Figure 4A:
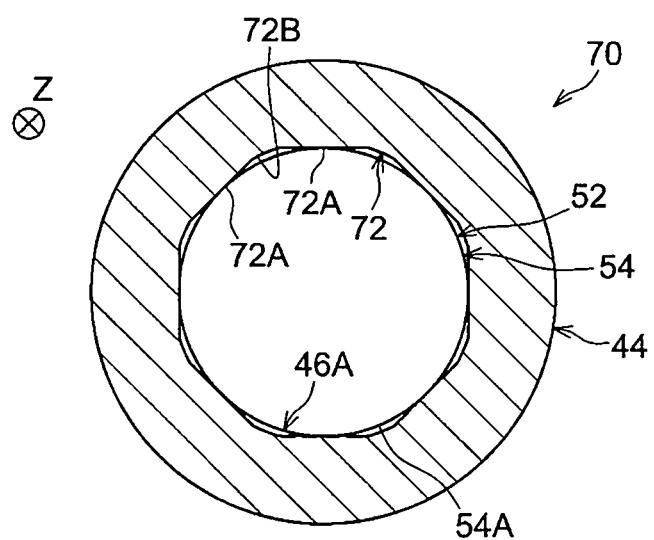
FIG. 4A is a cross-sectional view of a second inner wall portion according to a second embodiment.
Figure 4B:
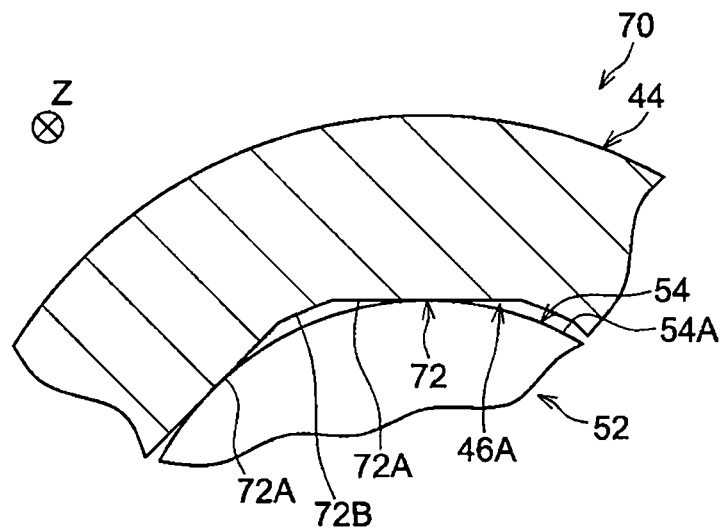
FIG. 4B is an enlarged partial cross-sectional view of the second inner wall portion according to the second embodiment.

The lens unit 70 illustrated in FIGS. 4A and 4B has a structure such that, in the lens unit 30 (see FIG. 1), the second inner wall portion 48 of the lens barrel 44 (see FIG. 3A) is changed with a second inner wall portion 72. Elements other than the second inner wall portion 72 are the same as those of the lens unit 30.

The second inner wall portion 72 faces the outer peripheral surface of the second circular portion 54 of the first lens 52. The second inner wall portion 72 has a regular octagonal shape, which is an example of a polygonal shape, when viewed in the Z direction. In the present specification, a "polygonal shape" includes not only the shape a polygon but also the shape of a polygon with chamfered or rounded corners. The second inner wall portion 72 has eight flat surfaces 72A, which correspond to the sides of a regular octagon when the lens barrel 44 is viewed in the Z direction, and eight curved surfaces 72B. The second inner wall portion 72 has the heat caulking portion 44E (see FIG. 2).

The eight flat surfaces 72A are examples of contact portions. The eight flat surfaces 72A are disposed so that each of the flat surfaces 72A overlaps a tangent line of a circle that represents the outer peripheral surface of the second circular portion 54 when viewed in the Z direction. That is, each of the eight flat surfaces 72A is in point-contact with a part of the outer peripheral surface of the second circular portion 54, when viewed in the Z direction.

The eight curved surfaces 72B each connect a pair of the flat surfaces 72A that are adjacent to each other in the circumferential direction of the first lens 52. The eight curved surfaces 72B are disposed on an imaginary circle (not shown) when viewed in the Z direction. The diameter D3 of the imaginary circle on which the eight curved surfaces 72B are disposed is larger than the inside diameter D3 described above (see FIG. 3B).

Operational Effects

Next, operational effects of the lens unit 70 according to the second embodiment will be described.

With the lens unit 70, because the second inner wall portion 72 has a regular octagonal shape when viewed in the Z direction, contact between the second circular portion 54 and each of the flat surfaces 72A of the second inner wall portion 72 is point contact when viewed in the Z direction. Because the contact between the second circular portion 54 and each of the flat surfaces 72A is point contact, the contact area between the second circular portion 54 and the flat surfaces 72A is reduced and a frictional force between the second circular portion 54 and the flat surfaces 72A is reduced, compared with a structure in which the second circular portion 54 and contact portions line-contact each other in the circumferential direction when viewed in the Z direction. That is, with the lens unit 70, ease of assembly of the lens unit 70 can be improved, compared with a structure in which the second circular portion 54 and the contact portions line-contact each other when viewed in the Z direction.

With the lens unit 70, each of the curved surfaces 72B connect a pair of the flat surfaces 72A. With the lens unit 70, when an external force is applied, a stress is less likely to concentrate on a portion where the pair of flat surfaces 72A are connected. Therefore, stress concentration on a part of the lens barrel 44 can be suppressed, compared with a structure in which a pair of the flat surfaces 72A that are adjacent to each other in the circumferential direction are directly connected.

Third Embodiment

Next, a lens unit 80 according to a third embodiment will be described. Elements that are the same as those of the first embodiment and the second embodiment will be denoted by the same numerals, and descriptions of such elements will be omitted.

Figure 5:
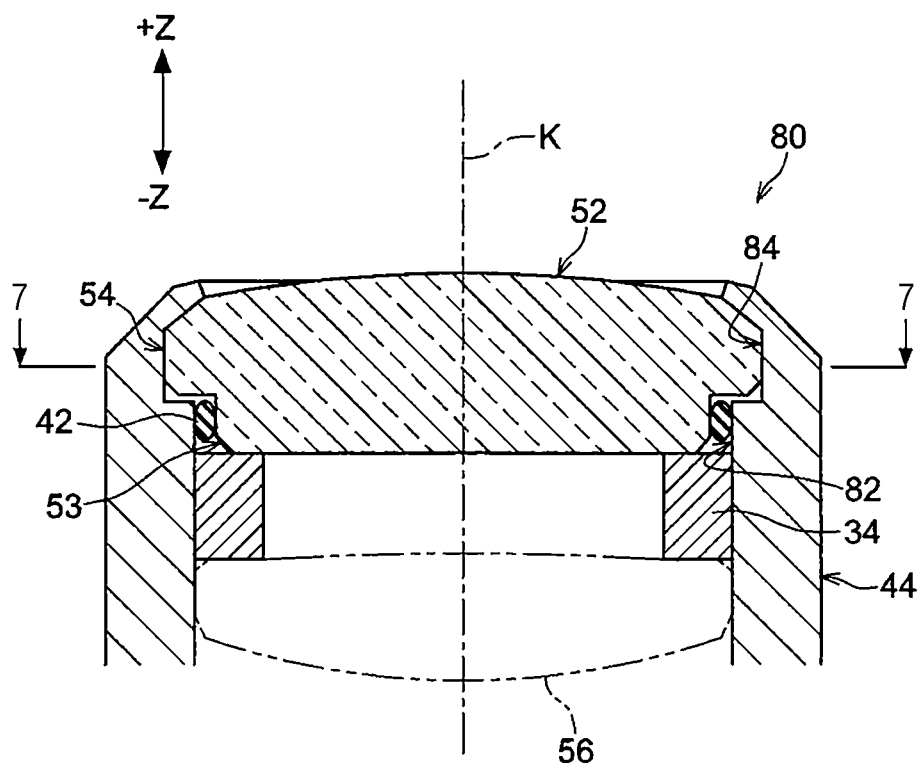
FIG. 5 is a partial longitudinal sectional view of a lens unit according to a third embodiment.
Figure 6:
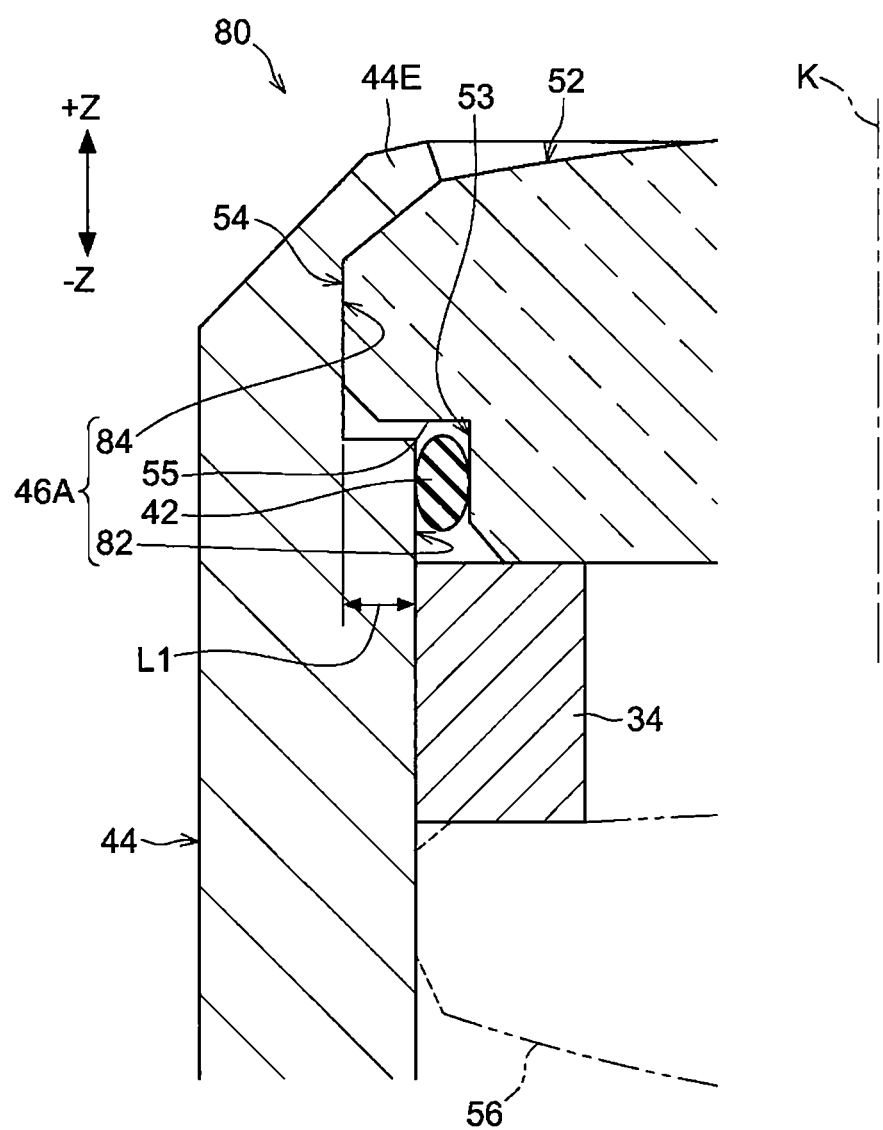
FIG. 6 is an enlarged partial longitudinal sectional view of the lens unit according to the third embodiment.

The lens unit 80 illustrated in FIGS. 5 and 6 has a structure such that, in the lens unit 30 (see FIG. 1), the first inner wall portion 47 of the lens barrel 44 (see FIG. 2) is changed with a first inner wall portion 82, and the second inner wall portion 48 (see FIG. 2) is changed with a second inner wall portion 84. Elements other than the first inner wall portion 82 and the second inner wall portion 84 are the same as those of the lens unit 30.

The first inner wall portion 82 protrudes toward the optical axis K relative to the second inner wall portion 84 and is circular when viewed in the Z direction. That is, in the lens unit 80, the inside diameter of the first inner wall portion 82 is smaller than the diameter of an inscribed circle (not shown) of the second inner wall portion 84 when viewed in the Z direction. The sealing member 42 is pressed between the first circular portion 53 and the first inner wall portion 82 in a direction perpendicular to the Z direction. The length L1 by which the first inner wall portion 82 protrudes from the second inner wall portion 84 toward the optical axis K in the direction perpendicular to the Z direction is smaller than the length d described above (see FIG. 2).

Figure 7:
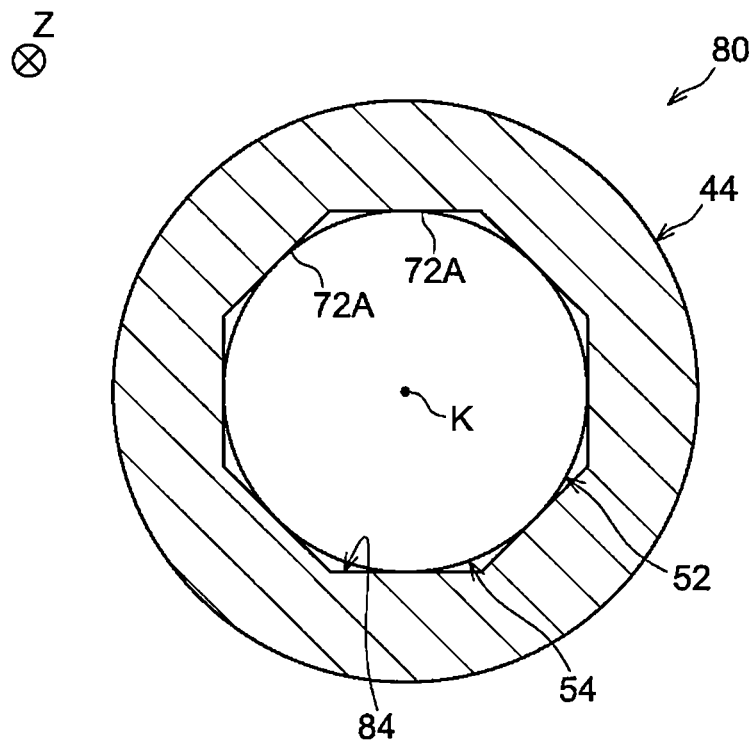
FIG. 7 is a cross-sectional view (taken along line 7-7 in FIG. 5) of a second inner wall portion according to the third embodiment.

The second inner wall portion 84 illustrated in FIG. 7 has, for example, a regular octagonal shape when viewed in the Z direction. That is, the second inner wall portion 84 has eight flat surfaces 72A that correspond to the sides of the regular octagonal shape. The flat surfaces 72A are in point-contact with the second circular portion 54 when viewed in the Z direction.

Operational Effects

Next, operational effects of the lens unit 80 according to the third embodiment will be described.

As a comparative example for the lens unit 80, with a lens unit in which the inside diameter of the first inner wall portion is the same as the inside diameter of the second inner wall portion when viewed in the Z direction, the sealing member 42 may become stuck on the second inner wall portion when the first lens 52 is inserted into the lens barrel.

On the other hand, with the lens unit 80 illustrated in FIG. 5, the inside diameter of the first inner wall portion 82 is smaller than the diameter of an inscribed circle (not shown) of the second inner wall portion 84 when viewed in the Z direction. In other words, a space inside the second inner wall portion 84 is larger than a space inside the first inner wall portion 82. Therefore, when inserting the first lens 52 and the sealing member 42 into the lens barrel 44, sticking of the sealing member 42 on the second inner wall portion 84 can be suppressed.

Fourth Embodiment

Next, a lens unit 90 according to a fourth embodiment will be described. Elements that are the same as those of the first to third embodiments will be denoted by the same numerals, and descriptions of such elements will be omitted.

Figure 8:
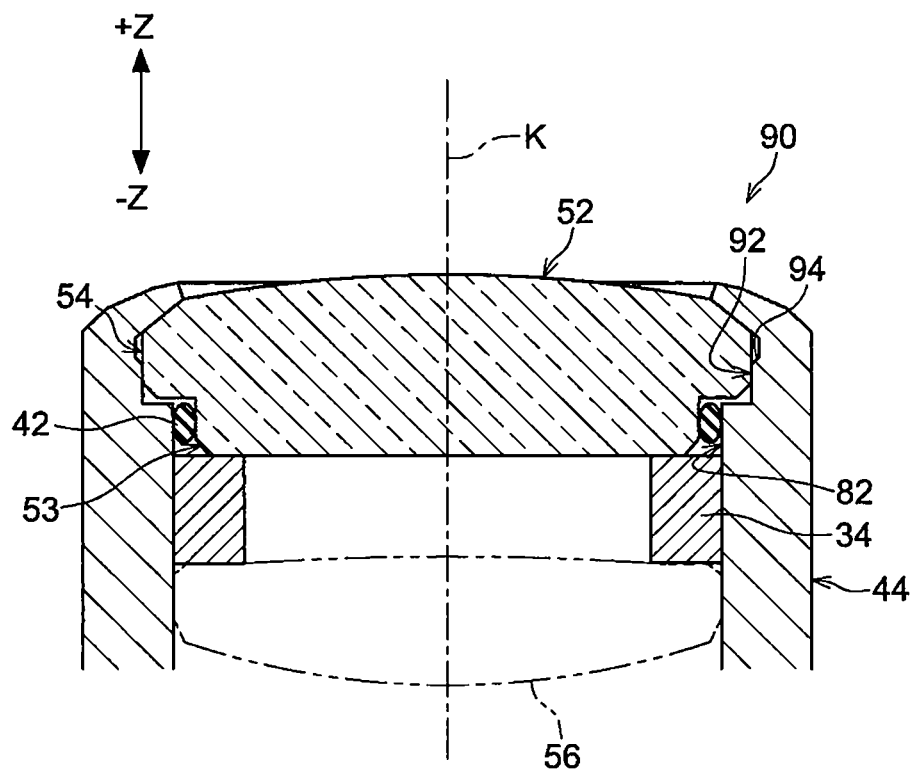
FIG. 8 is a partial longitudinal sectional view of a lens unit according to a fourth embodiment.

The lens unit 90 illustrated in FIG. 8 has a structure such that, in the lens unit 80 (see FIG. 5), the second inner wall portion 84 (see FIG. 5) of the lens barrel 44 is changed with a second inner wall portion 92. Elements other than the second inner wall portion 92 are the same as those of the lens unit 80.

Figure 9:
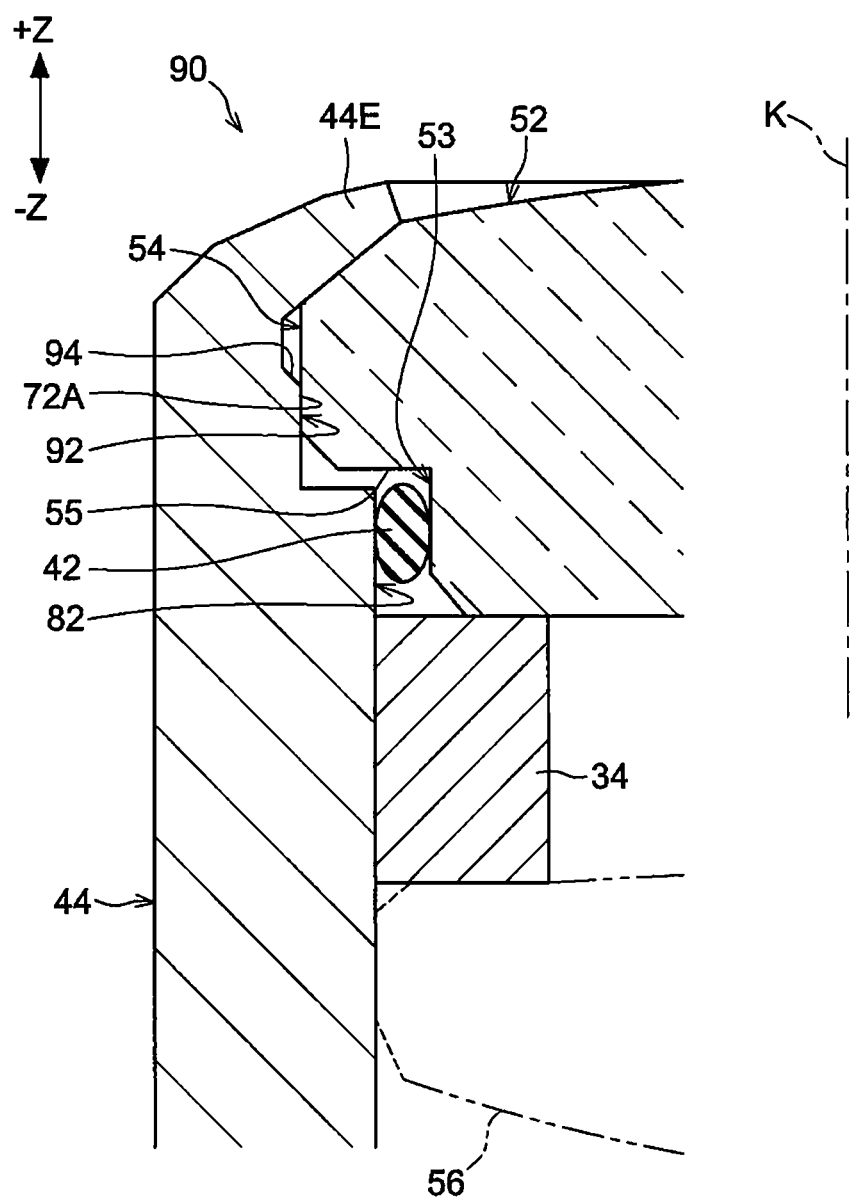
FIG. 9 is an enlarged partial longitudinal sectional view of the lens unit according to the fourth embodiment.

The second inner wall portion 92 illustrated in FIG. 9 has the heat caulking portion 44E; the flat surfaces 72A, which are disposed on the −Z side relative to the heat caulking portion 44E and are fitted to the second circular portion 54 at multiple points; and an inclined surface 94, which is located between the heat caulking portion 44E and the flat surfaces 72A in the Z direction. That is, the inclined surface 94 is formed on the +Z side relative to the flat surfaces 72A of the second inner wall portion 92 in the Z direction. Eight flat surfaces 72A are arranged in the circumferential direction of the first lens 52.

The inclined surface 94 is formed in the lens barrel 44 in an annular shape when viewed in the Z direction. The inclined surface 94 is inclined in such a way that a part thereof on the +Z side is farther from the optical axis K (the central axis of the lens barrel 44) than a part thereof on the −Z side. That is, a space into which the first lens 52 is to be inserted is enlarged on a part of the inclined surface 94 on the +Z side, compared with a part of the inclined surface 94 on the −Z side.

Operational Effects

Next, operational effects of the lens unit 90 according to the fourth embodiment will be described.

With the lens unit 90, for example, when the first lens 52 is inserted into the lens barrel 44 in a state in which the position of the optical axis K of the first lens 52 is displaced from the central axis (not shown) of the lens barrel 44, a chamfered part of the second circular portion 54 of the first lens 52 contacts the inclined surface 94. Then, the first lens 52 is guided by the inclined surface 94, thereby the optical axis K approaches the central axis (not shown) of the lens barrel 44, and the second circular portion 54 contacts the flat surfaces 72A. That is, because the second circular portion 54 is guided by the inclined surface 94, the operation of inserting the first lens 52 into the lens barrel 44 can be easily performed, compared with a structure that does not have the inclined surface 94.

Fifth Embodiment

Next, a lens unit 100 according to a fifth embodiment will be described. Elements that are the same as those of the first to fourth embodiments will be denoted by the same numerals, and descriptions of such elements will be omitted.

Figure 10:
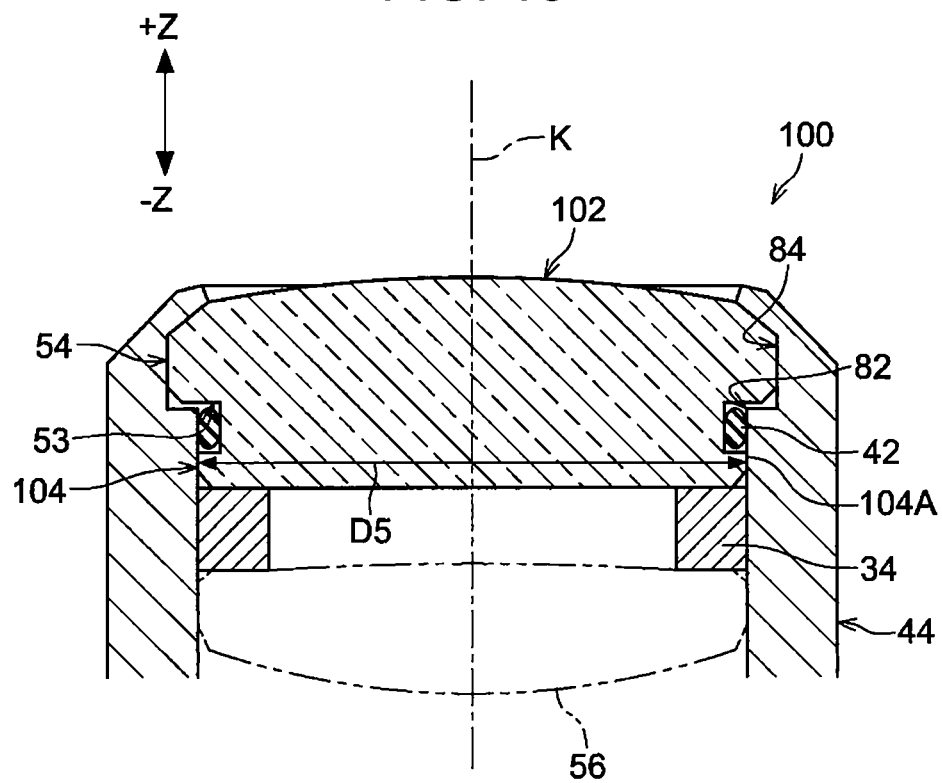
FIG. 10 is a partial longitudinal sectional view of a lens unit according to a fifth embodiment.

The lens unit 100 illustrated in FIG. 10 has a structure such that, in the lens unit 80 (see FIG. 5), the first lens 52 (see FIG. 5) is changed with a first lens 102. Elements other than the first lens 102 are the same as those of the lens unit 80.

The first lens 102 is made of glass and has the first circular portion 53, the second circular portion 54, and a third circular portion 104. The second circular portion 54 is disposed on the +Z side relative to the first circular portion 53, and the third circular portion 104 is disposed on the −Z side relative to the first circular portion 53. In the lens unit 100, the sum of the length of the first circular portion 53 and the length of the third circular portion 104 in the Z direction is the same as the length of the first circular portion 53 (see FIG. 5) of the lens unit 80 (see FIG. 5) in the Z direction.

The third circular portion 104 has a third diameter D5, which is the diameter of an outermost periphery thereof, when viewed in the Z direction. The third diameter D5 is larger than the first diameter D1 (see FIG. 2) and smaller than the second diameter D2 (see FIG. 2). A side surface 104A, which is an outer peripheral surface of the third circular portion 104, is fitted to a part of the first inner wall portion 82 that the sealing member 42 does not contact. The sealing member 42 is disposed in a space surrounded by the first circular portion 53, the second circular portion 54, the third circular portion 104, and the first inner wall portion 82.

Operational Effects

Next, operational effects of the lens unit 100 according to the fifth embodiment will be described.

With the lens unit 100, which has fitting portions of the first inner wall portion 82 and the third circular portion 104 in addition to the contact portions of the first circular portion 53 and the sealing member 42, inclination of the optical axis K of the first lens 102 can be suppressed, compared with a structure that does not have the third circular portion 104.

Sixth Embodiment

Next, a lens unit 110 according to a sixth embodiment will be described. Elements that are the same as those of the first to fifth embodiments will be denoted by the same numerals, and descriptions of such elements will be omitted.

Figure 11:
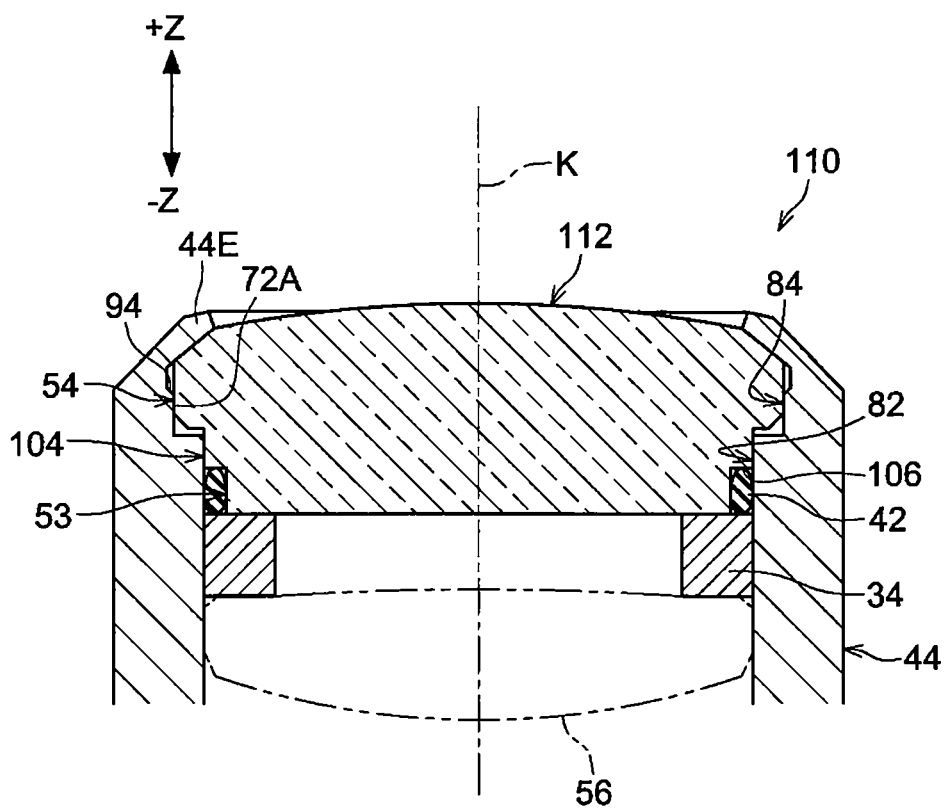
FIG. 11 is a partial longitudinal sectional view of a lens unit according to a sixth embodiment.

The lens unit 110 illustrated in FIG. 11 has a structure such that, in the lens unit 100 (see FIG. 10), the first lens 102 (see FIG. 10) is changed with a first lens 112. The second inner wall portion 84 of the lens unit 110 has the inclined surface 94 between the heat caulking portion 44E and the flat surfaces 72A in the Z direction. Moreover, the flat surfaces 72A that are adjacent to each other are connected by the curved surfaces 72B (see FIG. 4B). In the lens unit 110, elements other than the first lens 112, the inclined surface 94, and the curved surfaces 72B are the same as those of the lens unit 100.

The first lens 112 has a structure such that, in the first lens 102 (see FIG. 10), the first circular portion 53 is changed with the third circular portion 104, and a chamfered portion of the third circular portion 104 on the −Z side is omitted. The third circular portion 104 is disposed on the +Z side relative to the first circular portion 53 and on the −Z side relative to the second circular portion 54.

Operational Effects

Next, operational effects of the lens unit 110 according to the sixth embodiment will be described.

With the lens unit 110, a step 106 is formed by an end surface of the third circular portion 104 in the Z direction and the outer peripheral surface of the first circular portion 53. When the first lens 112 is installed in the lens barrel 44, the sealing member 42 contacts the step 106 and is pressed toward the −Z side in the Z direction. Therefore, when fitting the first lens 112 into the lens barrel 44, displacement of the sealing member 42 from the first lens 112 in the Z direction can be suppressed.

Seventh Embodiment

Next, a lens unit 120 according to a seventh embodiment will be described. Elements that are the same as those of the first to sixth embodiments will be denoted by the same numerals, and descriptions of such elements will be omitted.

Figure 12:
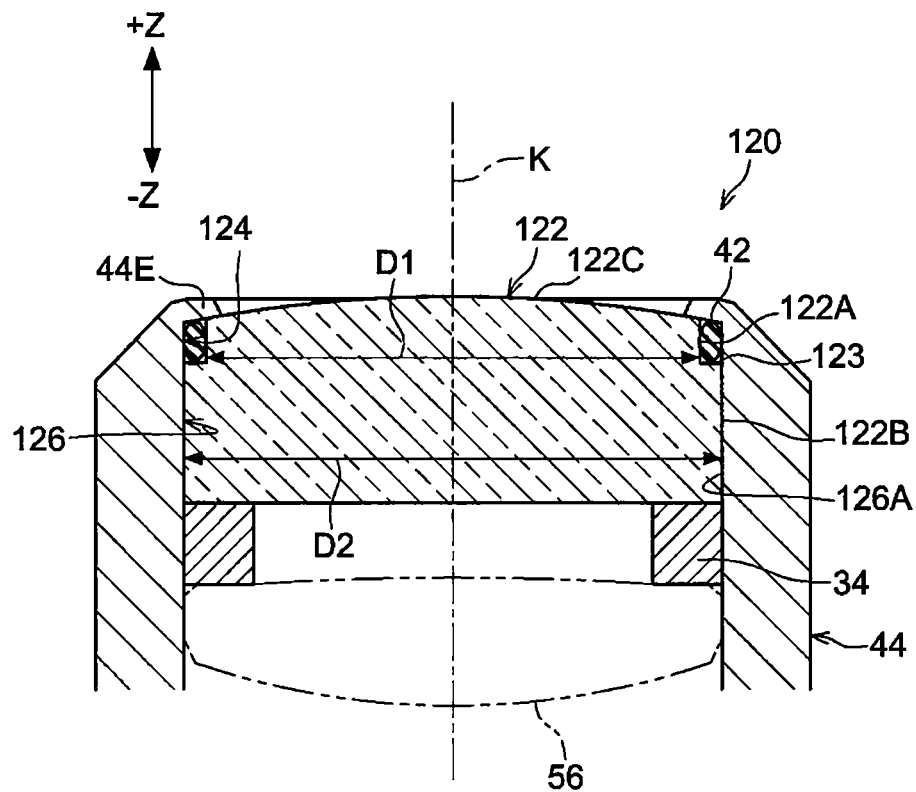
FIG. 12 is a partial longitudinal sectional view of a lens unit according to a seventh embodiment.

The lens unit 120 illustrated in FIG. 12 has a structure such that, in the lens unit 70 (see FIG. 4A), the first lens 52 (see FIG. 4A) is changed with a first lens 122. Moreover, the lens unit 110 has a structure such that the first inner wall portion 47 (see FIG. 2) of the lens barrel 44 and the second inner wall portion 72 (see FIG. 4A) are changed with a first inner wall portion 124 and a second inner wall portion 126, and the first inner wall portion 124 is disposed on the +Z side relative to the second inner wall portion 126. Elements other than the first lens 122, the first inner wall portion 124, and the second inner wall portion 126 are the same as those of the lens unit 70.

The first lens 122 is made of glass. In the first lens 122, for example, a first circular portion 122A and a second circular portion 122B are arranged in the Z direction and integrated with each other. The first circular portion 122A has a first diameter D1, which is the diameter of an outermost periphery thereof, when viewed in the Z direction. The first circular portion 122A has an incident surface 122C on which light is incident.

The second circular portion 122B is disposed on the −Z side relative to the first circular portion 122A. The second circular portion 122B has a second diameter D2, which is the diameter of an outermost periphery thereof, when viewed in the Z direction. The second diameter D2 is larger than the first diameter D1. Because the first diameter D1 differs from the second diameter D2, a step 123 is formed at the boundary between the first circular portion 122A and the second circular portion 122B.

The length of the second circular portion 122B in the Z direction is larger than the length of the first circular portion 122A in the Z direction. The central position of the first circular portion 122A and the central position of the second circular portion 122B are the same when viewed in the Z direction.

The first inner wall portion 124 is circular when viewed in the Z direction. The first inner wall portion 124 faces the first circular portion 122A in a direction perpendicular to the Z direction. A peripheral edge portion of the first inner wall portion 124 around the opening 44C is, for example, the heat caulking portion 44E, which is bent toward the optical axis K by heat caulking. The sealing member 42 is pressed between the first circular portion 122A and the first inner wall portion 124.

The second inner wall portion 126 has, for example, a regular octagonal shape when viewed in the Z direction. The length of the second inner wall portion 126 in the Z direction is the same as the length of the second circular portion 122B in the Z direction. The second circular portion 122B is in point-contact with each of flat surfaces 126A, which form the sides of the regular octagonal shape of the second inner wall portion 126 when viewed in the Z direction. The flat surfaces 126A are examples of contact portions. The flat surfaces 126A that are adjacent to each other when viewed in the Z direction are connected by the curved surfaces 72B (see FIG. 4B).

Operational Effects

Next, operational effects of the lens unit 120 according to the seventh embodiment will be described.

With the lens unit 120, because the first inner wall portion 124 is circular when viewed in the Z direction, a gap is less likely to be formed between the sealing member 42 and the first inner wall portion 124 when the sealing member 42 contacts the first inner wall portion 124, compared with a case where the sealing member 42 contacts a polygonal inner wall portion. That is, high sealability in the lens barrel 44 can be achieved.

With the lens unit 120, because the second inner wall portion 126 has an octagonal shape when viewed in the Z direction, contact between the second circular portion 122B and the second inner wall portion 126 is point contact when viewed in the Z direction. Because the contact between the second circular portion 122B and the second inner wall portion 126 is point contact, the contact area between the second circular portion 122B and the second inner wall portion 126 is reduced, compared with a structure in which the second circular portion 122B and a second inner wall portion line-contact each other. Therefore, a frictional force between the second circular portion 122B and the second inner wall portion 126 is reduced. That is, with the lens unit 120, ease of assembly of the lens unit 120 can be improved, compared with a structure in which the second circular portion 122B and the second inner wall portion line-contact each other when viewed in the Z direction.

Moreover, with the lens unit 120, the first circular portion 122A is disposed on the +Z side relative to the second circular portion 122B. That is, because the step 123 is disposed at a position in the lens barrel 44 farthest toward the +Z side, the sealing member 42 is disposed at a position in the lens barrel 44 farthest toward the +Z side. Therefore, whether the sealing member 42 is fitted in the gap between the first inner wall portion 124 and the first circular portion 122A can be easily checked from the outside of the lens barrel 44.

Eighth Embodiment

Next, a lens unit 130 according to an eighth embodiment will be described. Elements that are the same as those of the first to seventh embodiments will be denoted by the same numerals, and descriptions of such elements will be omitted.

Figure 13:
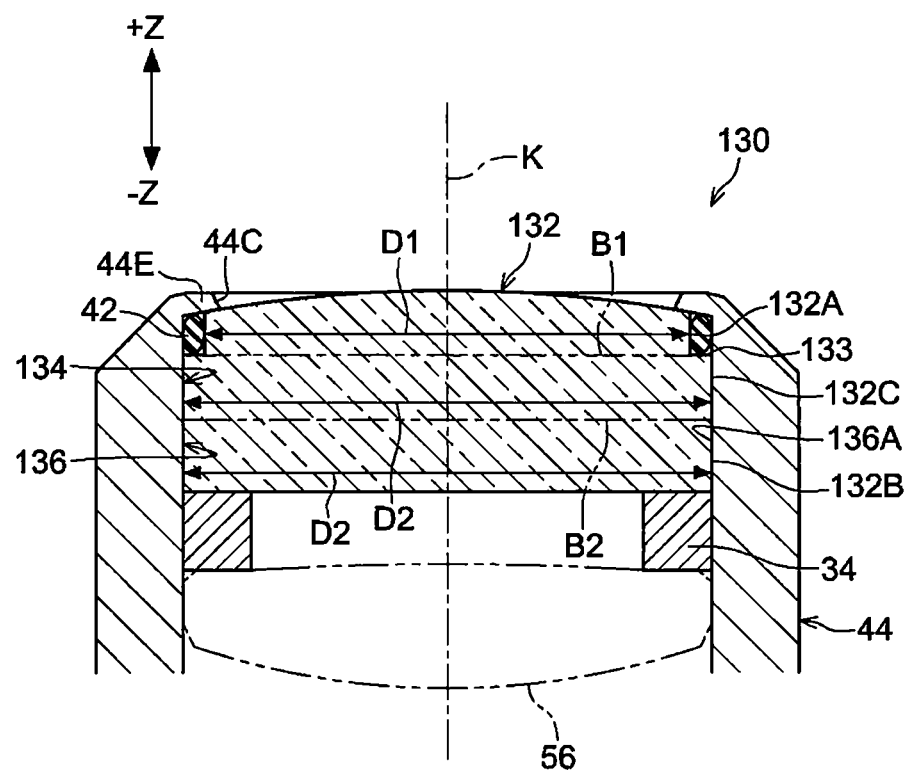
FIG. 13 is a partial longitudinal sectional view of a lens unit according to an eighth embodiment.

The lens unit 130 illustrated in FIG. 13 has a structure such that, in the lens unit 120 (see FIG. 12), the first lens 122 (see FIG. 12) is changed with a first lens 132. Moreover, the lens unit 130 has a structure such that the first inner wall portion 124 (see FIG. 12) and the second inner wall portion 126 (see FIG. 12) of the lens barrel 44 are changed with a first inner wall portion 134 and a second inner wall portion 136. Elements other than the first lens 132, the first inner wall portion 134, and the second inner wall portion 136 are the same as those of the lens unit 120.

The first lens 132 is made of glass and has a first circular portion 132A, a second circular portion 132B, and a third circular portion 132C. The first circular portion 132A is disposed at a position farthest toward the +Z side, the third circular portion 132C is disposed on the −Z side relative to the first circular portion 132A, and the second circular portion 132B is disposed on the −Z side relative to the third circular portion 132C. That is, the third circular portion 132C is disposed between the first circular portion 132A and the second circular portion 132B in the Z direction. A step 133 is formed at the boundary between the first circular portion 132A and the third circular portion 132C. The central position of the first circular portion 132A, the central position of the second circular portion 132B, and the central position of the third circular portion 132C are the same when viewed in the Z direction.

The first circular portion 132A has a first diameter D1, which is the diameter of an outermost periphery thereof, when viewed in the Z direction. The first circular portion 132A has a light incident surface. The second circular portion 132B has a second diameter D2, which is the diameter of an outermost periphery thereof, when viewed in the Z direction. The third circular portion 132C has a second diameter D2, which is the diameter of an outermost periphery thereof, when viewed in the Z direction. The sealing member 42 is disposed in a space surrounded by the first circular portion 132A, the third circular portion 132C, and the first inner wall portion 134 described below.

In FIG. 13, an imaginary line representing the boundary between the first circular portion 132A and the third circular portion 132C is shown by a two-dot chain line B1, and an imaginary line representing the boundary between the third circular portion 132C and the second circular portion 132B is shown by a two-dot chain line B2. The second circular portion 132B and the third circular portion 132C do not differ in appearance. That is, a portion that contacts the first inner wall portion 134 described below is the third circular portion 132C, and a portion that contacts the second inner wall portion 136 is the second circular portion 132B.

The first inner wall portion 134 is circular when viewed in the Z direction. The first inner wall portion 134 faces an outer peripheral surface of the first circular portion 132A and is in contact with an outer peripheral surface of the third circular portion 132C in a direction perpendicular to the Z direction. In other words, the third circular portion 132C is fitted to a part of the first inner wall portion 134 that the sealing member 42 does not contact. Moreover, a peripheral edge portion of the first inner wall portion 134 around the opening 44C is the heat caulking portion 44E, which is bent toward the optical axis K by heat caulking. The sealing member 42 is pressed between the first circular portion 132A and the first inner wall portion 134.

The second inner wall portion 136 is disposed on the −Z side relative to the first inner wall portion 134. The second inner wall portion 136 has, for example, an octagonal shape when viewed in the Z direction. The length of the second inner wall portion 136 in the Z direction is the same as the length of the second circular portion 132B in the Z direction. The second circular portion 132B is in point-contact with each of flat surfaces 136A, which correspond to the sides of the octagonal shape of the second inner wall portion 136 when viewed in the Z direction. The flat surfaces 136A are examples of contact portions. The flat surfaces 136A that are adjacent to each other when viewed in the Z direction are connected by the curved surfaces 72B (see FIG. 4B).

Operational Effects

Next, operational effects of the lens unit 130 according to the eighth embodiment will be described.

With the lens unit 130, because the first inner wall portion 134 is circular when viewed in the Z direction, a gap is less likely to be formed between the sealing member 42 and the first inner wall portion 134 when the sealing member 42 contacts the first inner wall portion 134, compared with a case where the sealing member 42 contacts a polygonal inner wall portion. That is, high sealability in the lens barrel 44 can be achieved.

With the lens unit 130, because the second inner wall portion 136 has an octagonal shape when viewed in the Z direction, contact between the second circular portion 132B and the second inner wall portion 136 is point contact when viewed in the Z direction. Because the second circular portion 132B and the second inner wall portion 136 are in point contact, the contact area between the second circular portion 132B and the second inner wall portion 136 is reduced, compared with a case where the second circular portion 132B and a second inner wall portion line-contact each other. Then, a frictional force between the second circular portion 132B and the second inner wall portion 136 is reduced. That is, with the lens unit 130, ease of assembly of the lens unit 130 can be improved, compared with a structure in which the second circular portion 132B and the second inner wall portion line-contact each other when viewed in the Z direction.

Moreover, with the lens unit 130, the first circular portion 132A is disposed on the +Z side relative to the second circular portion 132B. That is, because the step 133 is disposed at a position in the lens barrel 44 farthest toward the +Z side, the sealing member 42 is disposed at a position in the lens barrel 44 farthest toward the +Z side. Therefore, whether the sealing member 42 is fitted in the gap between the first inner wall portion 134 and the first circular portion 132A can be easily checked from the outside of the lens barrel 44.

Moreover, the lens unit 130 has fitting portions that are contact portions of the first inner wall portion 134 and the third circular portion 132C in addition the contact portions of the sealing member 42 and the first inner wall portion 134 and the contact portions of the second circular portion 132B and the second inner wall portion 136. Because the lens unit 130 additionally has the fitting portions of the first inner wall portion 134 and the third circular portion 132C, the contact area between the lens barrel 44 and the first lens 132 is increased, compared with a structure that does not have the first inner wall portion 134 and the third circular portion 132C. Therefore, inclination of the optical axis K of the first lens 132 can be suppressed.

With the lens unit 130, because the third circular portion 132C is disposed on the −Z side relative to the first circular portion 132A, the sealing member 42 is not covered by the third circular portion 132C when viewed in the Z direction. Because the sealing member 42 is not covered by the third circular portion 132C, the sealing member 42 can be visually checked easily.

Ninth Embodiment

Next, a lens unit 140 according to a ninth embodiment will be described. Elements that are the same as those of the first to eighth embodiments will be denoted by the same numerals, and descriptions of such elements will be omitted.

Figure 14:
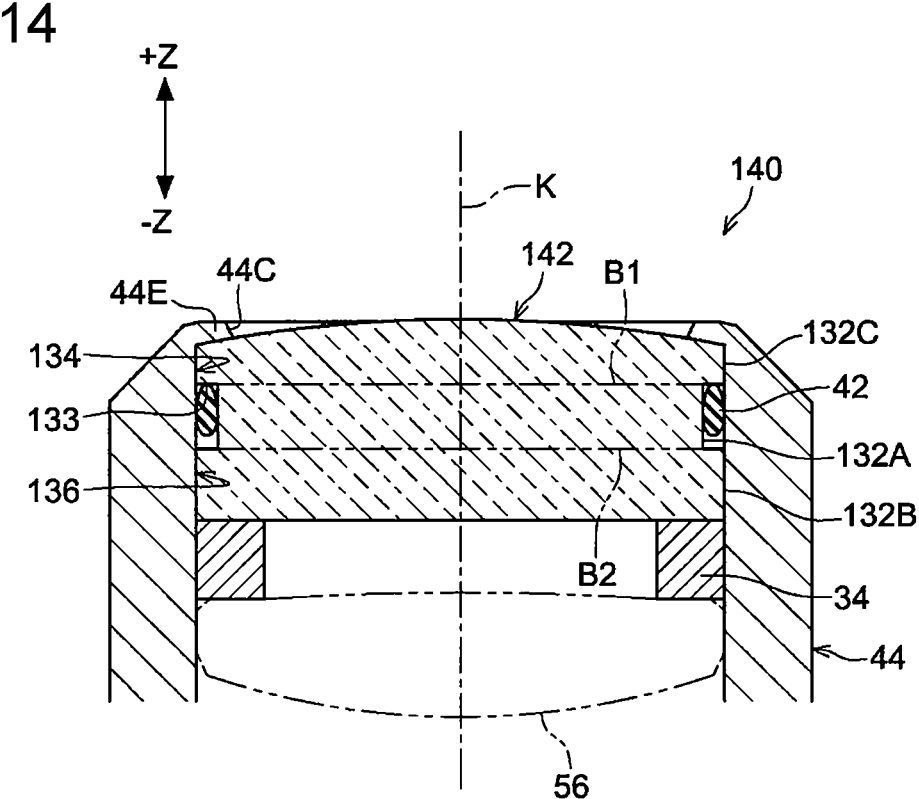
FIG. 14 is a partial longitudinal sectional view of a lens unit according to a ninth embodiment.

The lens unit 140 illustrated in FIG. 14 has a structure such that, in the lens unit 130 (see FIG. 13), the first lens 132 (see FIG. 13) is changed with a first lens 142. Elements other than the first lens 142 are the same as those of the lens unit 130.

The first lens 142 has a structure such that, in the first lens 132 (see FIG. 13), the third circular portion 132C is disposed on the +Z side relative the first circular portion 132A. The position of the second circular portion 132B does not differ. That is, the third circular portion 132C of the first lens 142 has a light incident surface. The heat caulking portion 44E is in contact with a peripheral edge portion of the third circular portion 132C.

Operational Effects

Next, operational effects of the lens unit 140 according to the ninth embodiment will be described.

With the lens unit 140, a step 133 is formed between an end surface of the third circular portion 132C on the −Z side and an outer peripheral surface of the first circular portion 132A. When the first lens 142 is installed in the lens barrel 44, the sealing member 42 contacts the step 133 and is pressed toward the −Z side. Therefore, when fitting the first lens 142 into the lens barrel 44, displacement of the sealing member 42 relative to the first lens 142 in the Z direction can be suppressed.

The present disclosure is not limited to the embodiments describe above.

Figure 15A:
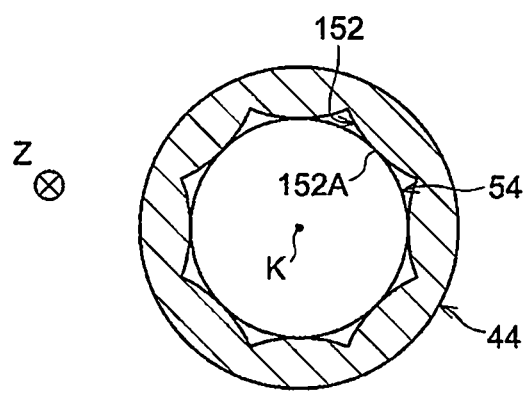
FIG. 15A illustrates a second inner wall portion according to a first modification.

As illustrated FIG. 15A, when the lens barrel 44 is viewed in the Z direction, eight surfaces 152A of a second inner wall portion 152 which point-contact the outer peripheral surface of the second circular portion 54, may be curved surfaces that protrude toward the optical axis K. The shape of the inner wall, which is composed of a plurality of curved surfaces that protrude toward the optical axis K, is included in a polygonal shape. The surfaces 152A are examples of contact portions.

Figure 15B:
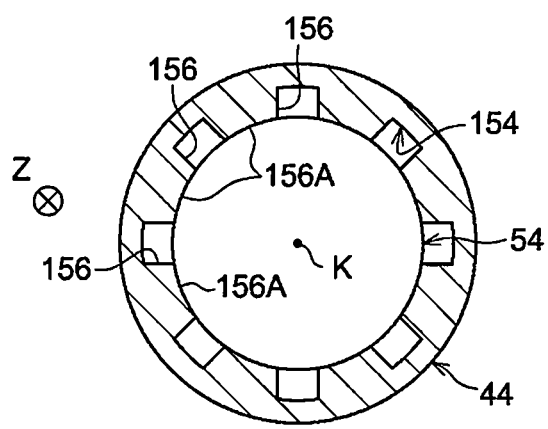
FIG. 15B illustrates a second inner wall portion according to a second modification.

As illustrated in FIG. 15B, when the lens barrel 44 is viewed in the Z direction, a second inner wall portion 154, which contacts the outer peripheral surface of the second circular portion 54, may have three or more contact portions 156 that are symmetrically disposed in the radial direction of the first lens 52. The contact portions 156 have contact surfaces 156A, which are examples of curved surfaces, at ends thereof on the optical axis K side. The contact surfaces 156A are curved surfaces that are recessed outward in the radial direction in accordance with the shape of the outer peripheral surface of the second circular portion 54.

Figure 15C:
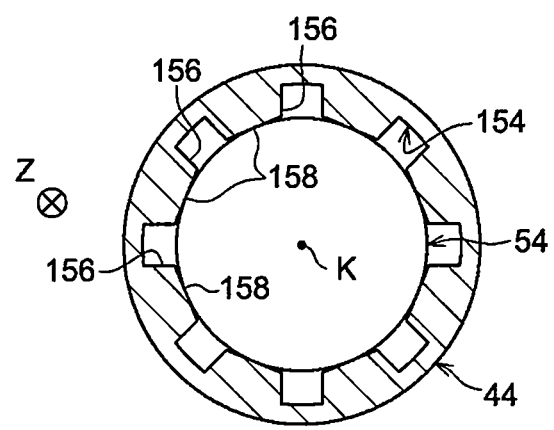
FIG. 15C illustrates a second inner wall portion according to a third modification.

As illustrated in FIG. 15C, the contact surfaces 156A (see FIG. 15B) of the second inner wall portion 154 may be flat surfaces 158.

The positions where the contact portions 48B are formed are not limited to three positions in the circumferential direction and may be four or more positions.

The optical system of the lens unit is not limited to the lens group 32 having five lenses. The optical system may be composed of one lens or two or more lenses. The number of spacer rings is not limited to three and may be one, two, or more. The number of sealing members 42 is not limited to one and may be two or more.

The first lens 52, the first lens 102, the first lens 112, the first lens 122, the first lens 132, and the first lens 142 may be made of a resin. The second lens 56 may be made of a resin. The third lens 57, the fourth lens 58, and the fifth lens 59 may be made of glass.

The lens unit may have a diaphragm or a light-shielding plate, in addition to lenses and spacer rings.

In the lens unit 110, the lens barrel 44 may have the curved surfaces 72B. The lens unit 110 may have the second inner wall portion 48 instead of the second inner wall portion 84, and the contact surfaces 49 and the side surface 54A of the second circular portion 54 may be fitted to each other.

The lens unit 130 may have the second inner wall portion 48 instead of the second inner wall portion 136, and the contact surfaces 49 and the side surface 54A of the second circular portion 54 may be fitted to each other.

The lens barrel 44 or the spacer rings 34, 36, and 38 may be made of, for example, a polyphenylene sulfide containing glass fiber and inorganic filler. By making the lens barrel 44 or the spacer rings 34, 36, and 38 from a fiber-reinforced plastic containing glass fiber and the like, the mechanical strength can be further increased. A resin that can be used is, for example, at least one selected from the group consisting of polyamide, polyacetal, polycarbonate, polyphenylene ether, polybutylene terephthalate, polyethylene terephthalate, polyethylene, syndiotactic polystyrene, polysulfone, polyethersulfone, polyphenylene sulfide, polyarylate, polyamide-imide, polyetherimide, polyetheretherketone, acrylonitrile butadiene stylene, polyolefin, and a modified polymer of each of these; or a polymer alloy including at least one selected from the group. As the fiber, glass fiber, carbon fiber, fiber-reinforced plastic, inorganic filler, or the like can be used.

The fiber-reinforced plastic and the resin material may include, as necessary, glass fiber, carbon fiber, inorganic filler, or the like. By making a lens barrel or a spacer ring from a fiber-reinforced plastic containing glass fiber or the like, a lens barrel or a spacer ring having higher mechanical strength can be obtained.

High light-shielding ability and light-absorbing ability are required for a lens barrel. Preferably, a black resin material is used, and preferably, the resin material contains a black pigment or a black dye. By forming a lens barrel from a resin material containing a black pigment or a black dye, the inner wall surface of the lens barrel can be colored black, and reflection of visible light by the inner wall surface of the lens barrel can be more effectively suppressed.

What is claimed is:
1. A lens unit comprising:
a lens in which a first circular portion and a second circular portion are arranged in an optical axis direction of the lens, the first circular portion having a first diameter when viewed in the optical axis direction, the second circular portion having a second diameter larger than the first diameter when viewed in the optical axis direction;

a sealing member that is annular when viewed in the optical axis direction and that has an inner peripheral surface that contacts an outer peripheral surface of the first circular portion; and a lens barrel comprising a first inner wall portion and a second inner wall portion, the first inner wall portion being circular when viewed in the optical axis direction and pressing the sealing member between the first inner wall portion and the first circular portion, the second inner wall portion having three or more contact portions that contact an outer peripheral surface of the second circular portion and that are arranged with spaces therebetween in a circumferential direction of the lens.

2. The lens unit according to claim 1,
wherein the second inner wall portion has a polygonal shape when viewed in the optical axis direction, and
wherein the contact portions are flat surfaces that correspond to sides of the polygonal shape.

3. The lens unit according to claim 2, wherein the second inner wall portion has curved surfaces that connect the flat surfaces that are adjacent to each other in the circumferential direction.

4. The lens unit according to claim 1, wherein the contact portions have curved surfaces that are recessed outward in a radial direction of the lens barrel when viewed in the optical axis direction and that line-contact the second circular portion.

5. The lens unit according to claim 1, wherein the second circular portion is disposed on an object side relative to the first circular portion in the optical axis direction.

6. The lens unit according to claim 5, wherein an inclined surface is formed at a position on the object side relative to the second inner wall portion in the optical axis direction, the inclined surface being inclined in such a way that a part thereof on the object side is farther from the optical axis than a part thereof on an image surface side.

7. The lens unit according to claim 1, wherein the first inner wall portion protrudes toward the optical axis relative to the second inner wall portion when viewed in the optical axis direction.

8. The lens unit according to claim 1,
wherein the first inner wall portion has a portion that the sealing member does not contact and to which the lens is fitted, and
wherein the lens has a third circular portion that is fitted to the first inner wall portion.

9. The lens unit according to claim 8, wherein the third circular portion is disposed between the first circular portion and the second circular portion in the optical axis direction.

10. The lens unit according to claim 1, wherein the first circular portion is disposed on an object side relative to the second circular portion in the optical axis direction.

11. The lens unit according to claim 10, wherein the lens has a third circular portion that is fitted to the first inner wall portion.

12. The lens unit according to claim 11, wherein the third circular portion is disposed between the first circular portion and the second circular portion in the optical axis direction.

13. The lens unit according to claim 1, wherein the lens unit is a vehicle-mount lens unit or a monitoring lens unit.

* * * * *